United States Patent
Dulip et al.

(10) Patent No.: US 8,464,224 B2
(45) Date of Patent: Jun. 11, 2013

(54) INTEGRATED PERFORMANCE AND LOAD TESTING TOOL FOR APPLICATION SERVERS

(75) Inventors: Samantha Dulip, Heidelberg (DE); Martin Moser, Speyer (DE); Markus Kohler, Kaiserslautern (DE); Stefan Fuchs, Wiesloch (DE); Maik Gartner, Frankfurt an der Oder (DE)

(73) Assignee: SAP AG, Walldorf (DE)

( * ) Notice: Subject to any disclaimer, the term of this patent is extended or adjusted under 35 U.S.C. 154(b) by 955 days.

(21) Appl. No.: 12/495,117

(22) Filed: Jun. 30, 2009

(65) Prior Publication Data
US 2010/0333072 A1    Dec. 30, 2010

(51) Int. Cl.
G06F 9/44    (2006.01)
G06F 9/45    (2006.01)

(52) U.S. Cl.
USPC ............................ 717/128; 717/129; 717/131

(58) Field of Classification Search
USPC .................................. 717/124–132, 140–143
See application file for complete search history.

(56) References Cited

U.S. PATENT DOCUMENTS

| | | | | |
|---|---|---|---|---|
| 5,774,724 A * | 6/1998 | Heisch | ........................... | 717/129 |
| 6,721,941 B1 * | 4/2004 | Morshed et al. | ............... | 717/127 |
| 6,728,949 B1 * | 4/2004 | Bryant et al. | .................. | 717/127 |
| 6,769,054 B1 * | 7/2004 | Sahin et al. | ................... | 711/162 |
| 6,775,826 B1 * | 8/2004 | Zahavi et al. | .................. | 717/128 |
| 7,213,113 B2 * | 5/2007 | Sahin et al. | ................... | 711/162 |
| 7,293,260 B1 * | 11/2007 | Dmitriev | ........................ | 717/130 |
| 7,506,315 B1 * | 3/2009 | Kabadiyski et al. | .......... | 717/128 |
| 7,516,209 B2 * | 4/2009 | Raghuraman et al. | ........ | 709/224 |
| 7,581,209 B2 * | 8/2009 | Filho | .............................. | 717/129 |
| 7,594,219 B2 * | 9/2009 | Ramachandran et al. | .... | 717/124 |
| 7,596,778 B2 * | 9/2009 | Kolawa et al. | ................ | 717/126 |
| 7,681,186 B2 * | 3/2010 | Chang et al. | .................. | 717/143 |
| 7,810,080 B2 * | 10/2010 | Plum et al. | .................... | 717/140 |
| 7,941,789 B2 * | 5/2011 | Ivanov et al. | .................. | 717/128 |
| 7,979,850 B2 * | 7/2011 | Ivanov et al. | .................. | 717/128 |
| 8,037,457 B2 * | 10/2011 | Stefanov | ........................ | 717/128 |
| 8,042,102 B2 * | 10/2011 | DeWitt et al. | ................. | 717/128 |
| 8,074,204 B2 * | 12/2011 | Comstock et al. | ............ | 717/125 |
| 8,185,877 B1 * | 5/2012 | Colcord | ........................ | 717/127 |
| 8,205,191 B1 * | 6/2012 | Kolawa et al. | ................ | 717/124 |
| 2005/0039171 A1 | 2/2005 | Avakian et al. | | |
| 2007/0083649 A1 | 4/2007 | Zuzga et al. | | |
| 2008/0306711 A1 | 12/2008 | Bansal | | |
| 2009/0138858 A1 | 5/2009 | Livshits et al. | | |

OTHER PUBLICATIONS

Betta et al, "A statistical approach for improving the performance of a tetsing methodology for measurement software", IEEE, pp. 1118-1126, 2008.*

(Continued)

*Primary Examiner* — Anil Khatri
(74) *Attorney, Agent, or Firm* — Fish & Richardson P.C.

(57) ABSTRACT

Implementations of the present disclosure provide for testing an application, and include loading a testing tool by a client that is in communication with an application server that executes the application, introducing probe code into a routine by a first component of the testing tool, the routine being called during execution of the application, and transmitting a request to the application using a second component of the testing tool. An elapsed time of an execution of the routine is determined based on the probe code, and a response is generated from the application server based on the request. A response time is determined based on the request and the response, and performance statistics are calculated based on the elapsed time and the response time.

18 Claims, 11 Drawing Sheets

OTHER PUBLICATIONS

Zhao et al, "Comprehensive comparision of convergence perfromance of optimization algorithms based on nonparametric statistical tests", IEEE, pp. 1-7, 2012.*

Beretvas, "System independent tracing for prediction of system performance", ACM, pp. 209-213, 1973.*

Cormode et al, "What's hot what's not: Tracking most frequent items dynamically", ACM Trans. on Database Sys. vol. 30, No. 1, pp. 249-278, 2005.*

European Search Report in Application No. 10006602.6 dated Jun. 15, 2011, 6 pages.

Lin Wang, U.S. Department of Education, "Web Performance Tuning" Powerpoint Presentation, © 2004, 16 pgs.

Introscope "Performance Monitoring and Troubleshooting for Java Environments," Mar. 22, 2007, http://products.datamation.com/site_management/testing/1114103679.html, downloaded Jun. 26, 2009.

* cited by examiner

INTEGRATED PERFORMANCE AND LOAD TESTING TOOL FOR APPLICATION SERVERS

BACKGROUND

A user, using a web browser, can access web-based systems that can retrieve, present, and traverse information resources on the World Wide Web. The web-based systems can include multiple components working together to provide the user with the information requested. For example, Java 2 Enterprise Edition (J2EE) can be used as a platform for building a multi-tier web-based system. J2EE applications can service Hypertext Transfer Protocol (HTTP) requests through a network of queues.

The performance of a web-based system can refer to how quickly the system services HTTP requests. The user experience is based on how quickly a request made through a web browser to a web site is serviced. For example, performance can become critical when a web site needs to process a large volume of requests at a given point in time, creating a performance bottleneck.

During web-based system development, performance tuning can identify and eliminate performance bottlenecks. Performance testers can include tools that can put the web-based systems under load while testing the system's performance by measuring identified performance indicators.

SUMMARY

Implementations of present disclosure include a method of testing an application. In some implementations, the method includes loading a testing tool by a client that is in communication with an application server that executes the application, introducing probe code into a routine by a first component of the testing tool, the routine being called during execution of the application, and transmitting a request to the application using a second component of the testing tool. An elapsed time of an execution of the routine is determined based on the probe code, and a response from the application server is generated based on the request. A response time is determined based on the request and the response, and performance statistics are calculated based on the elapsed time and the response time.

In some implementations, the method further includes installing an agent on the application server, receiving, at the agent, at least one of a start time of the routine, an end time of the routine, a total duration of the routine, a relative timestamp, and metadata, generating trace data based on the at least one of the start time, the end time, the total duration, the relative timestamp, and the metadata, and storing the trace data in a database that is remote from the application server.

In some implementations, the method further includes issuing a command from the second component, retrieving trace data corresponding to the elapsed time based on the command, and providing the trace data to the second component. In some instances, retrieving trace data includes generating a query based on query parameters provided by a test infrastructure within which the testing tool is executed, accessing a database in which the trace data is stored based on the query, receiving a data string from the database based on the query, parsing the data string to determine the elapsed time, and providing the elapsed time to the second component.

In some implementations, the elapsed time includes one or more phase durations each of which corresponds to a phase of the routine.

In some implementations, the method further includes simulating a virtual user at the client using the second component of the testing tool, the virtual user transmitting the request to the application server.

In some implementations, the method further includes providing the elapsed time and the response time to the second component of the testing tool, and generating one or more graphs based on the elapsed time and the response time using the second component, the graphs corresponding to a performance of the application.

In some implementations, the method further includes determining a performance of the application based on the elapsed time and the response time, comparing the performance to a baseline performance, the baseline performance corresponding to a previous version of the application, and generating an indication that the performance is deficient based on the comparing.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
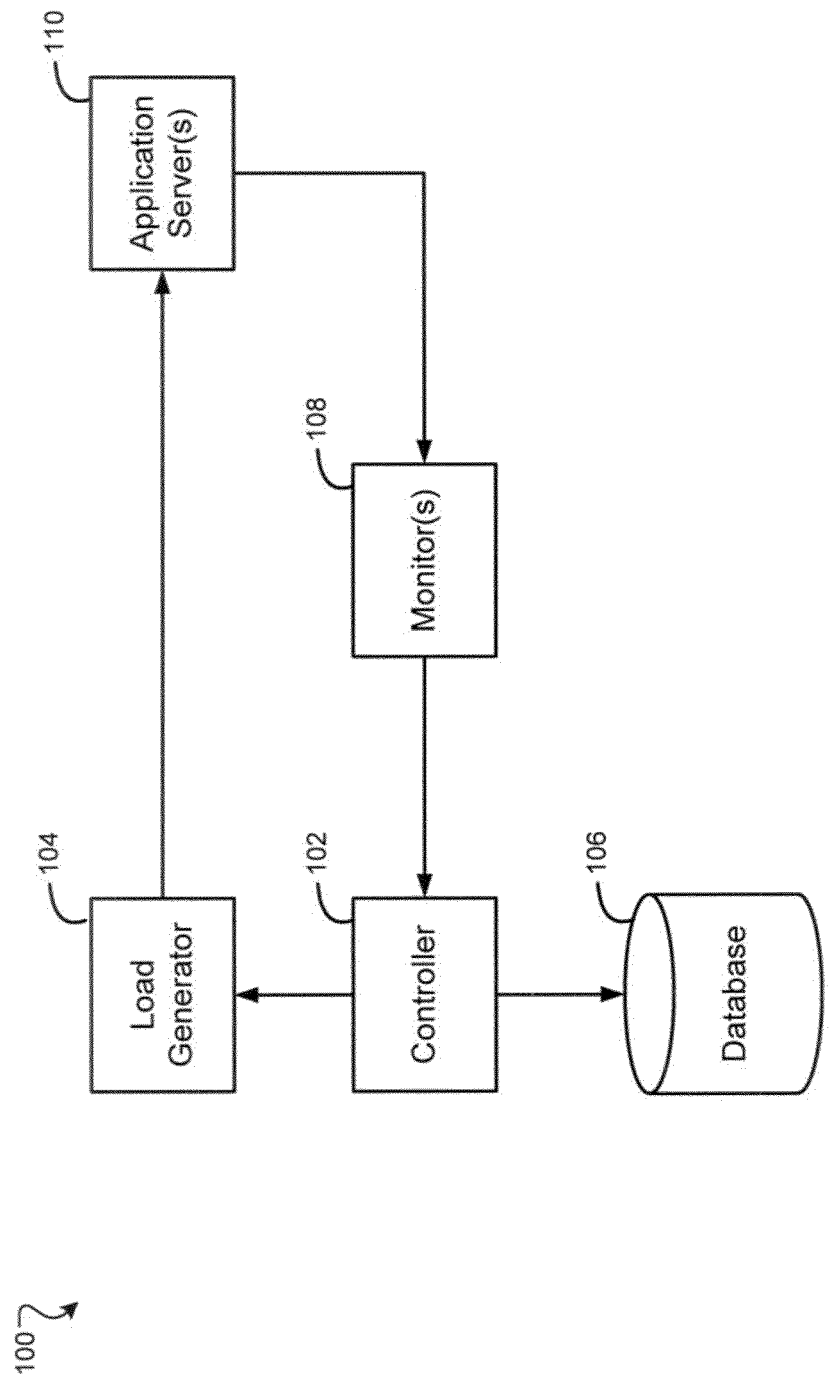
FIG. 1 is a block diagram of an exemplar testing architecture.

FIG. 1 is a block diagram of an exemplar testing architecture 100. A performance and load testing (PLT) tool in accordance with the present disclosure can be implemented using the testing architecture 100. The PLT tool can be used to execute load tests, stress tests and performance tests on an application that is executed on an application server. As discussed in further detail herein, and by way of non-limiting example, implementations of the present disclosure can find practical application in the development of web-based system to execute performance tuning that can identify and eliminate performance bottlenecks. Performance testers can include tools that put such web-based systems under load, while testing the system's performance by measuring identified performance indicators. For example, tools external to the web-based systems can simulate the test loads (e.g., a plurality of users). Tools internal to the web-based systems can measure system performance for a single user, while the system is under load.

By way of non-limiting example, the PLT tool can include HP Loadrunner Software provided by Hewlett-Packard Development Company. The PLT tool can examine application behavior and performance while generating a load on the application. More specifically, the PLT tool can emulate one or more concurrent users accessing an executing application in order to place the application through the rigors of real-life, real-time loads. As it does this, the PLT tool can collect information from infrastructure components (e.g., web servers, database servers, and the like). In some implementations, the PLT tool can analyze the information collected to determine the reasons for particular behavior. In some implementations, the PLT tool can present the information to an additional system component that can perform analysis on the information collected.

A load test, which may also be referred to as a response time test, can measure the response of an application while executing the test under heavy system usage. A stress test can execute a load test to determine a load under which the system fails. The evaluation of the application executing on the system under the load can be performed on the system as a whole or on a specific component of the system. In some implementations, the stress test can also determine the reasons for the system failure (e.g., determine why the system crashed). A performance test can execute a load test on an application to verify that certain identified performance requirements are fulfilled. In some implementations, a scalability test can successively load a system with an increased number of users until the system becomes overloaded. The scalability test can identify a maximum system load. In some implementations, a reliability test can load a system consistently for a prolonged period (e.g., several days). A reliability test can monitor the system during this period for stability.

The testing architecture 100 can include a controller 102, a load generator 104, a database 106, real time monitor(s) 108 and application server(s) 110. The controller 102 can manage scenarios, control a load test and monitor one or more application servers 110. A scenario can define events that occur during a testing session. For example, a scenario definition can include the number of virtual users (vusers), the actions they perform and the application server(s) 110 they run during the load test. By way of non-limiting example, the application server(s) 110 can include one or more Netweaver Application Servers provided by SAP AG.

A virtual user (vuser) can be provided as a software-generated user that executes the actions of a human user interacting with the application. In some implementations, a virtual user generator (VUGen) can generate a virtual user script (vuser script) that describes the actions a vuser is to perform during the execution of a load test. The VUGen can be a protocol-based tool that captures the communication between protocols and records them for future playbacks. The VUGen captured data can be saved in vuser scripts. A transaction can be an action or a set of actions that the web-based system can execute for the vuser. The transaction can be a user defined business process, which the PLT tool can measure. For example, during a load test, a vuser can interact with the application server, requesting information from the application. The requested information may be included in various components on the application server(s) 110 in the system. The PLT tool can measure the response time of the various components to the requests from the vuser. In some implementations, a vuser script can include a sequence of transactions where a transaction can include one or more requests to the server.

The controller 102 can run a load test based on a selected scenario by invoking the vuser script with its associated run-time settings for the scenario. During the load test, the controller 102 can monitor the status of each load-tested component in the web-based system. The monitor(s) 108 can record and display in real-time the measured values of the monitored load-tested components during the load test. Additionally, the controller 102 can save performance data generated during the load test in the database 106. In some implementations, an analysis tool or analyzer can use the performance data stored in the database 106 to generate graphs as part of a report generation process. In some implementations, the report generation process can include merging and adjusting the stored performance data.

The load generator 104 can also create vusers during the execution of a load test. The load generator 104 can execute previously recorded transactions saved as vuser scripts to generate a predetermined system load on the web-based system for testing. The load generator 104 can initialize a vuser, execute the vuser script and stop the vuser based on instructions received from the controller 102. Additionally, the load generator 104 can send status information for vusers back to the controller 102. The status information can include the status of each of the vusers and any measured performance indicators.

By way of non-limiting example, a load testing process can include five phases from planning the test to analyzing the test results. The first phase can include planning a load test. The PLT tool can define the testing conditions within the testing architecture 100. The testing conditions can include the number of concurrent vusers running on the system as well as the performance indicators to measure during the load test. The second phase can include creating vuser scripts. The VUGen can create vuser scripts that can emulate real-user actions during the load test. The third phase can include defining a scenario. The controller 102 can define the environment for the load test (e.g., which server to measure, which clients to run the load generators, etc.). The fourth phase can include executing the scenario. The controller 102 can execute and monitor the load test. During the load test, the monitor(s) 108 can display the real-time performance indicators of the load test. In addition, the controller 102 can store the results of the load test (e.g., performance indicators) in the database 106. The fifth phase can include analyzing the results. An analysis tool can be implemented to analyze the results saved by the controller 102 in the database 106, and generate to graphs and reports. The graphs and reports can be used to evaluate the performance of the system, application, and/or application servers.

In some implementations, a vuser script can record the communication in a hypertext transfer protocol (HTTP) in the application server(s) 110. The vuser script can include multiple sections that include, but are not limited to, an initialization section, an action section and an end section. The initialization section can initialize the vuser. The initialization section can also include functions to ensure that the system environment is in a well-defined state prior to running the load test in order for the load test to run without errors. The vuser can perform actions, defined as transactions, on the system for testing in an action section. The end section can perform the ending of vuser activities. The vuser script can define additional actions the system can perform. By way of one non-limiting example, the vuser script can define additional sections for logon and logoff to partition the logon and logoff processes into different sections.

The PLT tool can include several types of functions used in load testing including, but not limited to, action functions, control functions and service functions. A user can execute action functions in a web browser. For example, action functions can include selecting a web link, selecting a web image, or submitting a web form. The PLT tool can control and mark certain sections of the vuser script using control functions. For example, the PLT tool can mark the start and the end of a transaction in a vuser script. The service function can set the test environment or add services to the action functions. For example, a service function can set a web proxy or add customized headers to an HTTP request.

Figure 2:
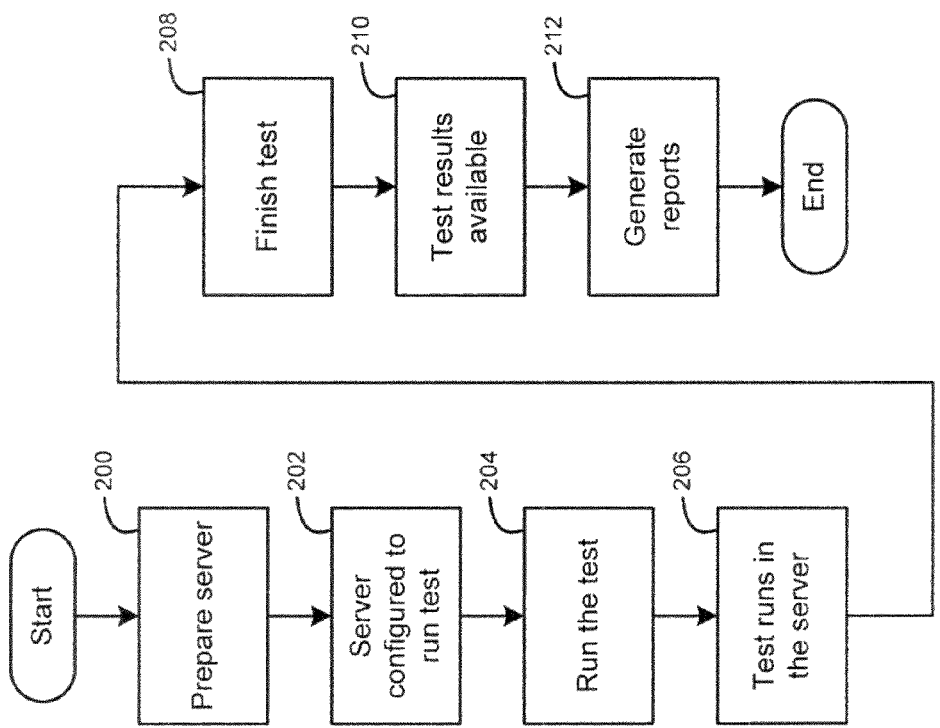
FIG. 2 is a flowchart illustrating exemplar steps that can be executed during testing.

Referring now to FIG. 2, a flowchart illustrates exemplar steps that can be executed during testing. A tester can be an individual who is part of an engineering performance team. The tester's job can include running load tests on one or more applications that are executed by one or more application servers to identify problems and/or regressions in the applications. The tester can use PLT tools to identify problems in server code bases running on one or more of the application servers in a load test. In some implementations, the tester can use the results of the load tests to identify bottlenecks and regression in one or more of the server code bases. The tester can compare the most recent server code base version with preceding server code base versions in order to identify regression. The tester can check a predefined set of performance indicators (e.g., server elapsed time, memory usage per transaction or end-to-end response time) to identify variations that occurred during the runtime of the load test in the server-code base.

The tester can use an Automated Regression Tool (ART) to manage the load tests. In some implementations, the ART can be a test infrastructure for automated execution of load tests. By way of non-limiting example, the Automated Regression InfrastructurE (ARIES) tool provided by SAP AG can be implemented. The ART can manage the exemplar steps illustrated in the flowchart in FIG. 2 that can be xecuted during testing. Load test management can include a plurality of phases including, but not limited to, a preparation phase, an execution phase and a results phase. In step 200, the application server is prepared for load testing. The ART can prepare an application server (e.g., one of the application server(s) 110 in FIG. I) for the load test. For example, the preparation can include changing Java virtual machine settings and adjusting the shared memory level in the server. As will be described in more detail in FIG. 6, an application server can run one or more java virtual machines when executing code in a server code base. The ART can also define additional monitors in the PLT tool to inspect the system resources of an application server.

In step 202, the server is configured to run the test. The ART can verify that the system for load testing is in a well-defined state prior to starting the load test. For example, the ART can verify that the application server will not perform additional tasks during the load test that could influence the test results or that could result in unpredicted server behavior. In step 204, the load test is run. For example, the ART starts the execution of the load test in the system. In step 206, the test runs in the application server. During the running of the load test in the application server, the ART monitors the load test for runtime errors or system failures. The ART can also manage different code lines in the server code bases running on the application server. In step 208, the test is finished. In step 210, the test results are available. For example, referring to FIG. 1, the test results can be stored in database 106 as well as displayed by the monitor(s) 108. Using the stored test results, the ART can generate reports in step 212. For example, the ART can generate a summary report and additional detailed reports on the measured performance indicators. The ART can also generate regression graphs from analysis of current and previously measured performance indicators. For example, the ART can provide the regression graphs as well as the additional report information to a web server for viewing by a tester in a web browser.

Figure 3:
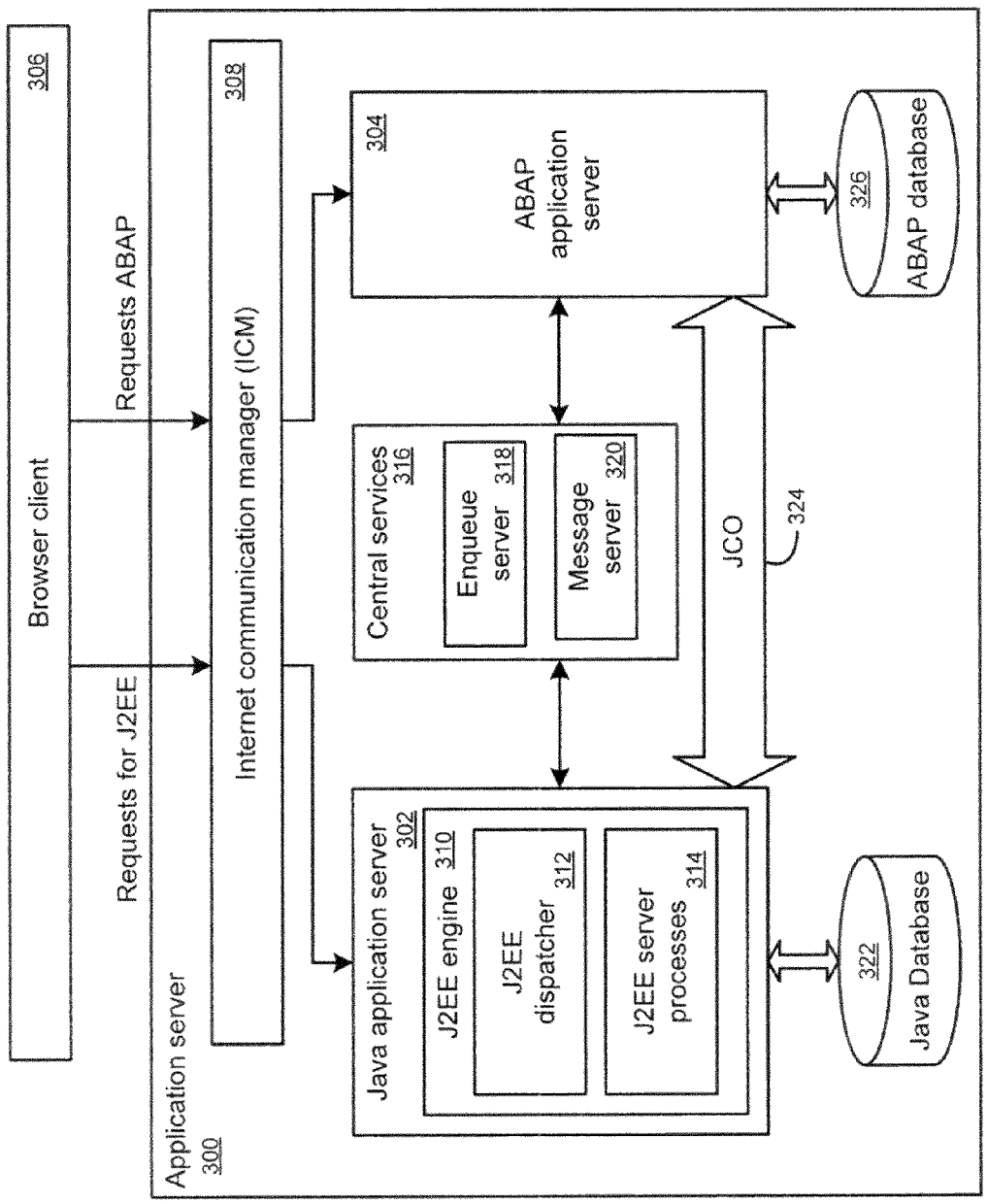
FIG. 3 is a functional block diagram including an exemplar application server.

FIG. 3 is a functional block diagram of an exemplar application server 300. The application server 300 (e.g., Netweaver Application Server) can be a software platform for integrating and running independent business applications, web services, standards based Java applications and Advanced Business Application Programming (ABAP) applications. ABAP is a high level programming language, developed by SAP AG, to run business applications on a server. For example, the application server 300 can serve as a technical foundation for SAP enterprise service orientated architecture (SOA). An enterprise service can be a set of web services combined with business logic.

The application server 300 can be used during the development of new software applications, and can integrate already existing software applications. The application server 300 can be configured using any combination of Java application servers and ABAP application servers. FIG. 3 illustrates a standard double stack installation (a single Java application server 302 and a single ABAP application server 304) of an application server (application server 300) and a browser client 306. For example, testers can use the double stack installation when conducting performance tests on an application server.

The application server 300 can include an Internet Communication Manager (ICM) 308. The ICM 308 can be the interface between the application server 300 and the browser client 306. The ICM 308 can transfer HTTP requests and responses between the browser client 306 and the application server 300. For example, the ICM 308 can receive an HTTP request from the browser client 306 and forward the HTTP request to either the Java application server 302 or the ABAP application server 304. The ICM 308 can receive the response for the request from the application server that received the request once that application sever has completed processing the request. The ICM 308 can forward the response back to the browser client 306.

The Java application server 302 can include a J2EE engine 310. The J2EE engine 310 can include a J2EE dispatcher 312 and J2EE server processes 314. A connection request handler in the J2EE dispatcher 312 can receive a request from the browser client 306 by way of the ICM 308. The connection request handler can connect the browser client 306 with the Java application server 302. A connection manager included in the J2EE dispatcher 312 can manage the connection and select a session service for the connection. The session service can send the request received from the browser client 306 to a communication handler included in the J2EE dispatcher 312. The communication handler can accept the data for the connection and pass it on to the J2EE server processes 314.

The J2EE server processes 314 can execute a Java application. In some implementations, the J2EE server processes 314 can be multithreaded allowing simultaneous processing of multiple requests. The J2EE server processes 314 can include an application program component, a session layer component and a communication handler component. The application program component can be the currently active application program running on the Java application server 302. The session layer component can perform in a similar manner to the session component in the J2EE dispatcher 312. The communication handler component can perform in a similar manner to the communication handler in the J2EE dispatcher 312.

The application server 300 can include central services 316. The central services 316 can include an enqueue server 318 and a message server 320. A Java database 322 can store data received from the Java application server 302 as well as provide data to the Java application server 302. The enqueue server 318 can manage locks (e.g., logical locks) set by the Java application server 302 in a J2EE server process. Using logical locks can allow the enqueue server 318 to set locks that can exceed the limits of the JAVA database 322. Specific logical locks can isolate simultaneously running transactions in the Java application server 302. In some implementations, the enqueue server 318 can synchronize data across a cluster in a cluster architected server. In some implementations, the enqueue server 318 can synchronize communication between the ABAP application server 304 and the Java application server 302.

The message server 320 can be used for communication between different Java instances in a Java cluster architecture. The tasks performed by the message server 320 can include event notification, broadcasts and cache content exchange. The message server 320 can maintain a list of dispatchers and server processes of the Java cluster. The message server 320 can execute services that can include notifying the dispatcher about which server processes are currently active or forwarding and broadcasting messages to the participants involved in the communication. In some implementations, the message server 320 can allow communication between ABAP instances on different servers.

In some implementations, a web portal can be a web-based front end for the application server 300. The web portal can allow an end user access to applications on the application server 300. For example, the web portal can provide an organized user interface for the tools and server code bases available on the application server 300.

A Java connector (JCO) 324 is a toolkit that allows inbound and outbound communication between the Java application server 302 and the ABAP application server 304. The JCO 324 can include a Java application program interface (Java API), a Java native interface (JNI) and a remote function call (RFC) library. For example, outbound communication from the Java application server 302 to the ABAP application server 304 can begin by forwarding a Java method through the Java API included in the JCO 324 to RFC middleware included in the RFC library in the JCO 324. The RFC middleware can convert the Java method to a RFC call that the JCO 324 can send to the ABAP application server 304. For example, inbound communication from the ABAP application server 304 to the Java application server 302 can begin by sending a RFC call from the ABAP application server 304 to the JCO 324. The JCO 324 can forward the RFC call through the RFC middleware included in the RFC library. The RFC middleware can convert the RFC call to a Java method that the JCO 324 can send to the Java application server 302.

As described above, FIG. 3 illustrates a standard double stack installation (a single Java application server 302 and a single ABAP application server 304) of an application server (application server 300) and a browser client 306. A Java stack included in the Java application server 302 and an ABAP stack included in the ABAP application server 304 can communicate via the JCO 324. The communication via the JCO 324 can implement a double stack as the Java application server 302 and the ABAP application server 304 are included in a single application server 300.

The ABAP application server 304 can include business applications that can run on the server. An ABAP database 326 can store data needed for the business applications as well as data resulting from the execution of business applications. In some implementations, the ABAP database 326 and the Java database 322 can be a single database accessible by both the Java application server 302 and the ABAP application server 304.

Although implementations of the present disclosure are described with reference to a Java application server, corresponding Java components, a Java database, an ABAP applications server, and an ABAP database, it is appreciated that the present disclosure is not limited to such application servers, components and/or databases. More specifically, the implementations of the present disclosure can be realized in diverse application server architectures including, but not limited, to the exemplar architectures described herein.

Figure 4:
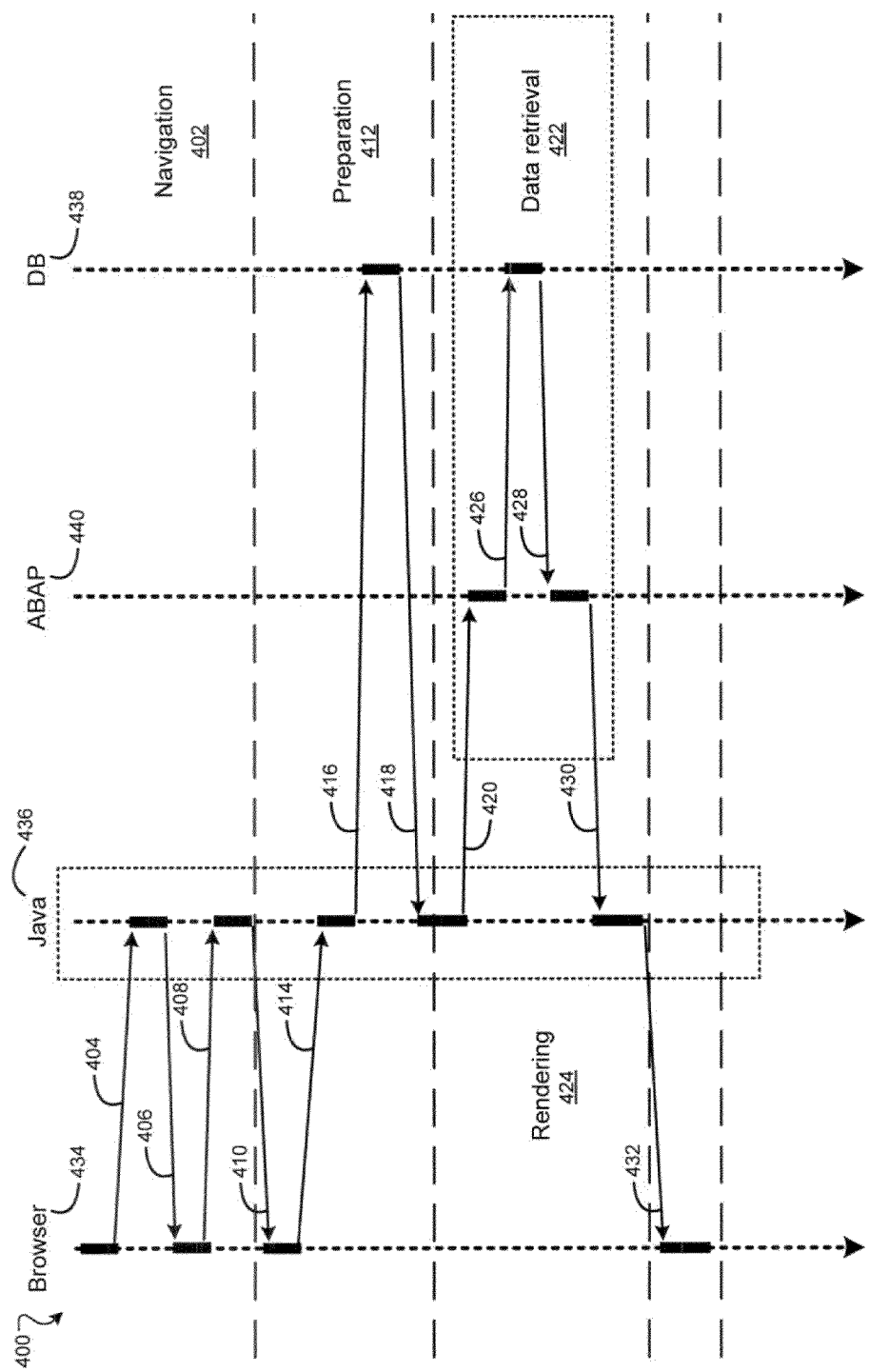
FIG. 4 is an illustration of an exemplar level-one breakdown that can be generated based on testing using an application server.

Referring now to FIG. 4, an illustration of an exemplar level-one breakdown 400 is provided, and can be generated based on load testing using an application server. The level-one breakdown 400 illustrates how a request is handled when a user executes an action (e.g., runs a selected application on the application server 300 in FIG. 3) in a web portal. The breakdown 400 can identify the components of the application server 300 that are responsible for specific executions that perform the action.

In some implementations, a user interface for a web-based application can be developed using a user interface programming (UIP) model. A programming model can be an abstract view of the structures and operations of a computing system (e.g., an application server). An example of a UIP model is Web Dynpro by SAP AG. The example Web Dynpro UIP model can be used to develop stateful applications where the application can save execution history information. In some implementations, the programming model can support Java and ABAP programming languages. A model view controller (MVC) architecture can organize the UIP model application where the model (M) can represent data present in the back end of the computing system, the view (V) can describe the visible area in a graphical user interface (GUI) which can include layout controls and the controller (C) can perform event handling. The front end of the UIP model can be a user interactive application (e.g., a web browser or an SAP GUI).

A user can describe the properties and functions of the application server under test using UIP model tools to create a UIP model application. The UIP model tools can create the data used in the UIP model applications. The data can be stored in tables as metadata. During runtime, the UIP model application can generate the necessary code from the stored metadata.

For example, a UIP model application for Java can run in the web portal inside a view window of the UIP model application. When a user executes an action in the view window, it calls the UIP model application to create the response. FIG. 4 illustrates exemplar phases of a request/response cycle in the level-one breakdown 400. A phase model can be a stateless model where any objects created and used for processing by the UIP model application are created once and destroyed upon the destruction of the request/response cycle.

A UIP model application dispatches a request to a source application in a navigation phase 402. A browser 434 launches the UIP model application in a new view window of the browser client. The browser 434 dispatches a request to a Java application server 436 to launch the UIP model application (404). The Java application server 436 responds back to the browser 434 (406) launching the UIP model application in a new window on the browser client. The user can request the execution of an action in a view window of the UIP model application and the browser 434 can dispatch this request to the Java application server 436 (408). The Java application server 436 can execute the requested action in the view window of the UIP model application on the browser 434 and respond back to the browser 434 that the Java application server 436 has executed the action (410). The level-one breakdown 400 then enters a preparation phase 412 where the resultant data from the action is prepared for retrieval and rendering.

In the preparation phase 412, the browser 434 dispatches a request to the Java application server 436 for the data generated by the execution of the user requested action (414). The Java application server 436 dispatches a request to a database 438 to retrieve the data (e.g., the navigation target) (416). The database 412 responds back to the Java application server 436 with the requested data (418). The level-one breakdown enters a data retrieval phase 422 of a rendering phase 424.

The rendering phase 424 prepares the resultant data for rendering in the view window of the UIP model application running on the browser. The data retrieval phase 422 is part of the rendering phase 424. In the data retrieval phase, the Java application server 436 dispatches a request to an ABAP application server 440 to retrieve and render the data generated by the action executed by the Java application server 436 and selected by the user in the view window of the UIP model application (420). The ABAP application server 440 dispatches a request to the database 438 to retrieve the data generated by the action (426). The database 438 responds back to the ABAP application server 440 with the retrieved data (428). The ABAP application server responds back to the Java application server 436 with retrieved data (430). The Java application server 436 can render the retrieved data and respond back to the browser 434 with the retrieved, rendered data (432). The browser 434 can display the rendered data in the view window of the UIP model application running on the browser client.

For example, a tester can view the rendered data of the level-one breakdown to determine the elapsed time of Java methods associated with the requested action. These elapsed times can indicate to a tester if the need to drill-down into additional Java methods (go into the lower levels of the Java methods) is necessary for deeper analysis. If drilling down is needed, the tester can execute another action in the view window that can provide this test data.

Figure 5:
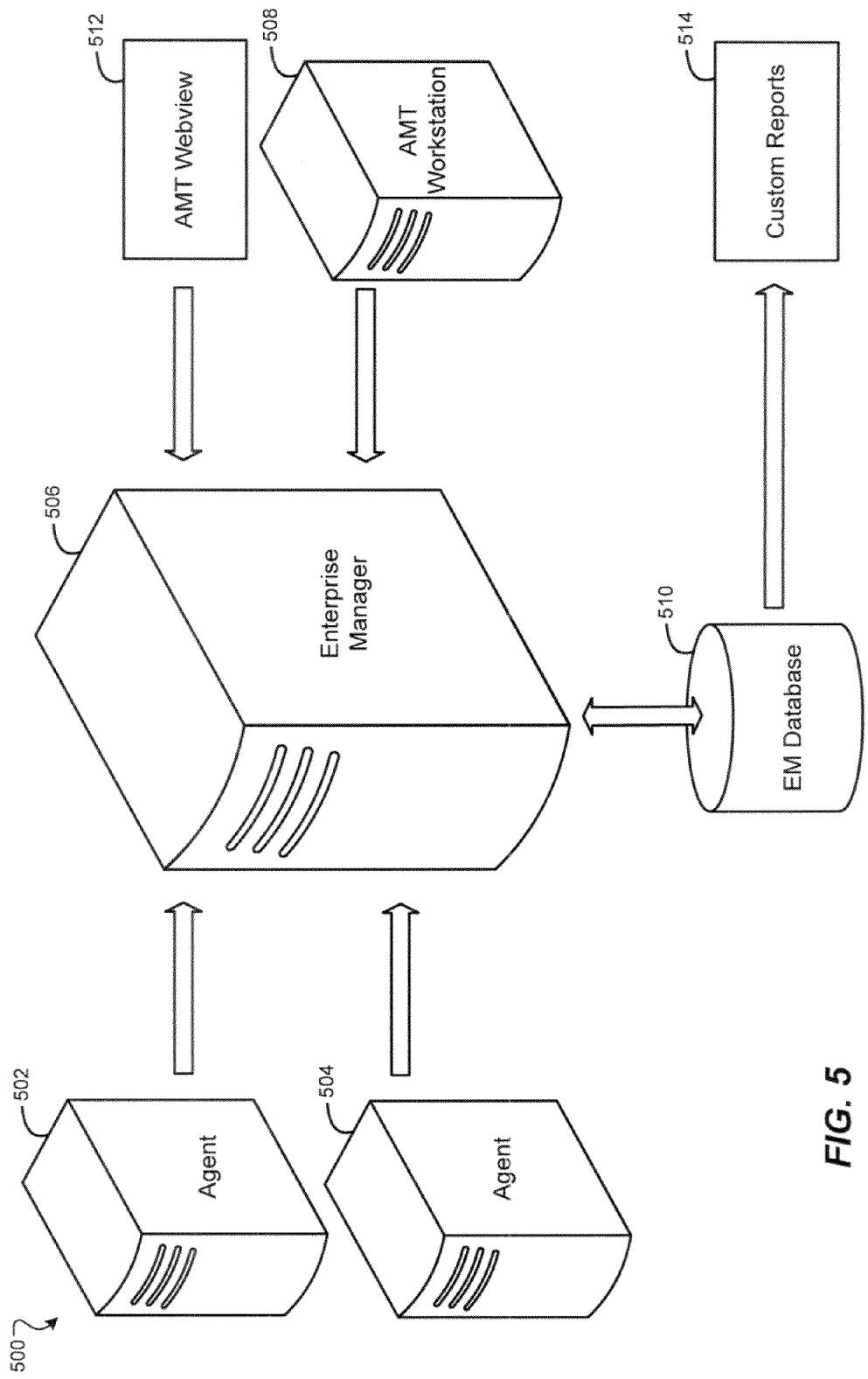
FIG. 5 is a block diagram of an exemplar system architecture for executing an application management tool in accordance with implementations of the present disclosure.

FIG. 5 is a block diagram of an exemplar system architecture 500 for executing an application management tool. The application management tool (AMT) can be a performance analysis tool for applications including, but not limited to, Java applications. By way of non-limiting example, Wily Introscope provided by CA Wily Technology can be implemented as the AMT. The architecture 500 for executing the AMT can include agents 502, 504, an enterprise manager 506, an AMT workstation 508 and an enterprise manager (EM) database 510. Additionally, the architecture 500 can include a database connector (e.g., IntroscopeJDBC Connector by CA Wily Technology) to make connections to the enterprise manager 506 using Java programs.

The enterprise manager 506 can measure the duration times of Java methods. The enterprise manager 506 can save the measured duration times in the EM database 510 for future reference (e.g., for use in load testing and analysis). The agents 502, 504 can trace an executing application. The enterprise manager 506 can receive the trace data from the agents 502, 504. The agents 502, 504 can log any instrumented method calls made by the code during program execution in order to trace the executing application. The agents 502, 504 can use bytecode instrumentation to trace the executing applications. For example, the agents 502, 504 can implement the bytecode instrumentation following pre-defined standards. Additionally, in some implementations, the agents 502, 504 can generate a transaction trace file for the application.

Bytecode instrumentation can modify bytecode (e.g., compiled Java source code) to include additional bytecodes in order to gather information from the executing code. Bytecode is, a sequence of one-byte long codes that a virtual machine can execute. The virtual machine can include software and data structures that facilitate running compiled application programs. The virtual machine can load the compiled application code (e.g., Java bytecode) using a class loader, for example. A bootstrap class loader can load the standard application program interface (API) and program classes, and custom class loaders (user-defined class loaders) can load other classes (e.g., user-defined classes). In some implementations, a virtual machine can use a custom class loader to modify the byte stream of a class before it is loaded into the virtual machine. In some implementations, a code package included with the code distribution can preprocess the byte stream during runtime of the program code but before the bytecode is loaded into the virtual machine.

The agents 502, 504 can modify the bytecodes of applications that execute on a virtual machine. The agents 502, 504 can modify the bytecodes using bytecode injection. For example, an agent 502 can read an input bytecode stream generated by a compiler, process the bytecode stream and modify the bytecode stream. The agent 502 can write the modified bytecode stream to the output stream, which the virtual machine receives for execution. In some implementations, in order for a virtual machine to identify the agent (e.g., agent 502 or agent 504) as its bytecode injector, the agent (e.g., the name of the agent Java Archive (JAR) file and its location) can be integrated into the bootstrap of the virtual machine that runs an application server. The virtual machine can run all the class bytecodes through the agent for preprocessing before creating a runtime instance of the class and loading the instance into the virtual machine. The agent can perform bytecode injection or leave the original bytecode unmodified.

Probe building can be bytecode injection by an agent (e.g., agents 502, 504), and a probebuilder directive can be the command used for building probes. For example, probebuilder directives can be included in text data files called probebuilder directive files. The agent can read the probebuilder directive file and can insert probe code, or probes, into their respective locations in the bytecode. A tracer can be a probebuilder directive that measures a performance indicator.

In some implementations, the agents 502, 504 can support dynamic bytecode instrumentation (BCI). In this mode of operation, a tester can dynamically (on-the-fly) change the probebuilder directive files. Dynamic BCI can correct erroneous probebuilder directives without having to stop and restart a testing process. Additionally, dynamic BCI can allow a tester to drill down into other methods, or routines, after receiving performance data back from tests performed at higher method levels without stopping and restarting the testing process.

The enterprise manager 506 can collect and process transaction trace data from the agents 502, 504. The agents 502, 504 can send the trace data to the enterprise manager 506 according to criteria set by a transaction trace session. The enterprise manager 506 can compile the transaction trace data and save it in the EM database 510.

The AMT workstation 508 can access the EM database 510 by way of the enterprise manager 506. The workstation 508 can include a GUI that allows a tester to analyze traced data stored in the EM database 510. For example, the GUI can allow online visualization of traces and can perform management functions.

Transaction trace viewers, included in the workstation 508, can analyze EM database queries. Examples of transaction trace viewers are live query viewers and historical query viewers. A live query viewer can show the transactions that meet a certain criteria specified by the tester. The tracer can save all the transaction data that meets the specified criteria in the EM database 510. The workstation 508 can automatically refresh the GUI, updating the displayed ongoing transaction. For example, a transaction to trace and display on the workstation 508 can be to display all transactions that exceed more than five milliseconds for thirty minutes.

A historical query viewer can allow a tester to query past transactions according to user specified criteria and view the transaction traces from previous tracing sessions. For example, a criteria for historical query viewing can be to display all the transaction traces for the time duration from t1 to t2, where t1 and t2 are times in the past. The transaction trace view can list all the transaction traces generated between the time stamps t1 and t2.

Historical and live query viewers can show all the transactions that meet the specific criteria in a table like view in a GUI where a tester can select each transaction trace in order to obtain additional information related to the transaction.

The historical and live query views can display the data in a summary view, a trace view and a tree view. For example, the summary view can show the metric path of a Java method, the number of calls made to the method, and the average response time of the method, or routine. For example, the trace view can show the metric path of a Java method where the length of each method is displayed as a graphical bar relative to the total trace length. For example, the tree view can show a hierarchical view of the metric path of a Java method starting from small elapsed-times to large elapsed-times.

Referring again to FIG. 5, an AMT webview 512 can be a browser-based Java monitoring tool that a tester can use for quick display purposes. The AMT webview 512 can display a read-only view of the metrics defined in the AMT workstation 508. Custom reports 514 can be created using the traced data stored in the EM database 510. In some implementations, an AMT, using bytecode instrumentation, can define the Java methods to trace. As described above, a tester can determine, by viewing the traced Java methods, that a drill-down into additional Java methods may be necessary for deeper analysis. The AMT can perform the drill-down by refining the bytecode instrumentation.

Figure 6:
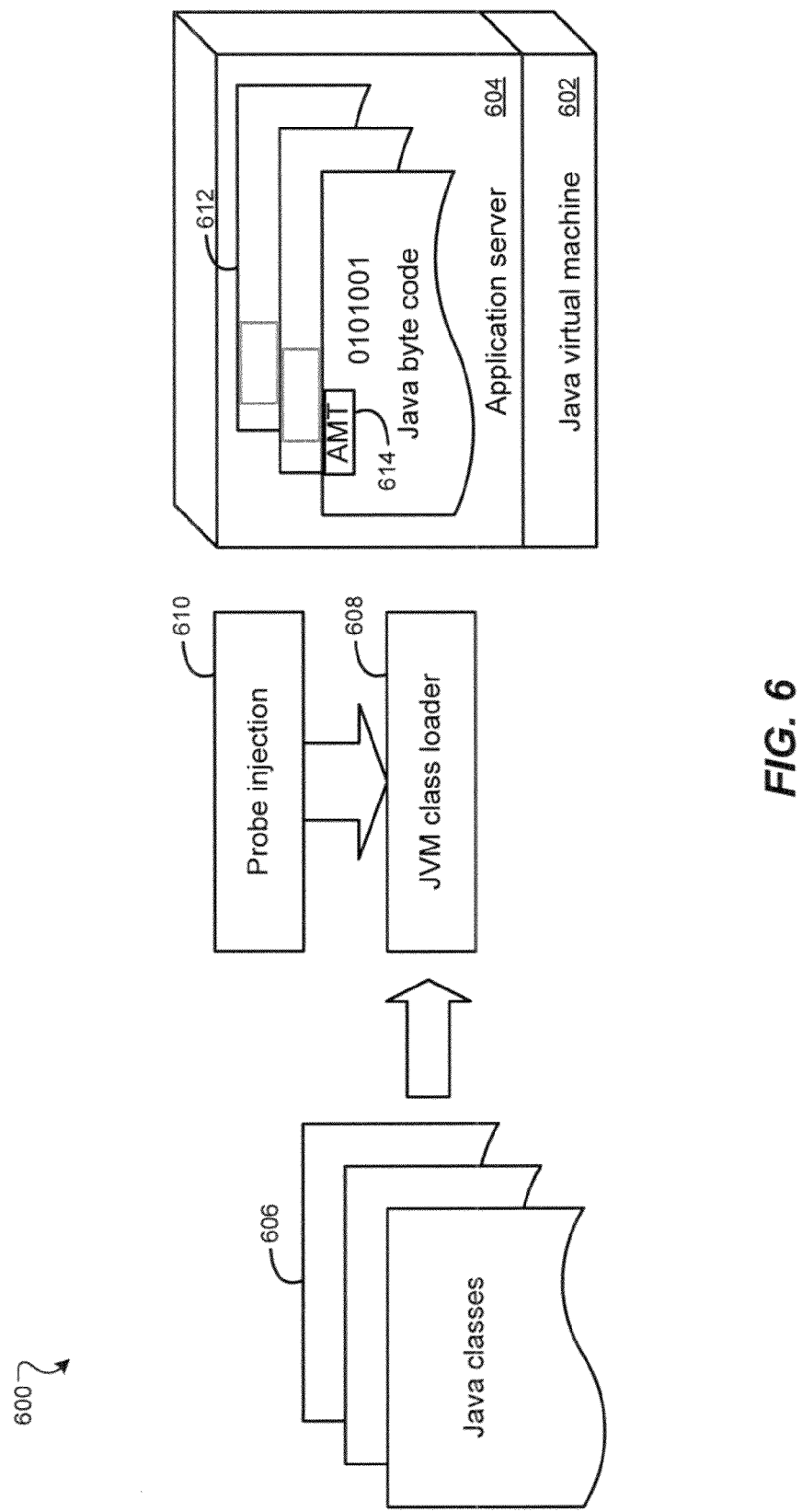
FIG. 6 is a block diagram illustrating an exemplar code injection that can be executed by the application management tool.

FIG. 6 is a block diagram illustrating an exemplar probe code injection 600 that can be executed by the AMT. The code injection 600 illustrates how an agent (e.g., agents 502, 504 in FIG. 5) can insert probebuilder directives into an application program, in this case, a Java application, when the Java bytecode is loaded into a Java virtual machine 602 included in an application server 604 (e.g., application server 300 in FIG. 3).

Java classes 606 can be input to a Java virtual machine (JVM) class loader 608. The JVM class loader 608 can modify the byte streams of the Java classes 606 before sending the byte streams to the Java virtual machine 602. Specifically, probe injection 610 can inject probe directives, converted into bytecodes, into the byte streams of the Java classes 606 before sending the byte streams to the Java virtual machine 602. An AMT 614 can execute the instrumented Java bytecode 612 on the Java virtual machine 602 included in the application server 604.

The present disclosure provides implementations of a combined AMT and PLT tool to execute load tests and identify problems at the method, or routine, level. In integrating these tools, it is desirable for the integration to enhance the testing environment. The integration should not add additional overhead to the performance test. The PLT tool can allow measured routine elapsed times to be available for online analysis (e.g., for example in a browser). Therefore, the tester can visualize performance issues to determine bottlenecks in the program code (e.g., Java program code) executed during the test run.

The integration of the AMT and the PLT tool enables the aggregation of several routine elapsed times into phases. This integrated load-testing tool can allow reporting of the consolidated values (the phases). An application program can include a bundle of many classes (a package). The integrated tool can provide a mechanism to assign each routine (e.g., Java method) back to its application program. For example, the integrated tool can trace the name of the application program, the package name, and the class name along with the routine name. The integrated tool can allow the tester the ability to change the measured methods in the performance test dynamically (on-the-fly). For example, a tester can monitor an increased lapse time for routine X, where routine X calls routines y1 and y2. The tester may want to instrument routines y1 and y2 to determine the exact method causing the increased time duration.

The integrated tool can provide a real time log of the performance test in the form of a log file. For example, the tester can use the log file information to compare reported elapsed times as testing is progressing in the event of a system crash and for reporting purposes. In some implementations, the log file can be read during a test while being updated by the test in the background.

Figure 7:
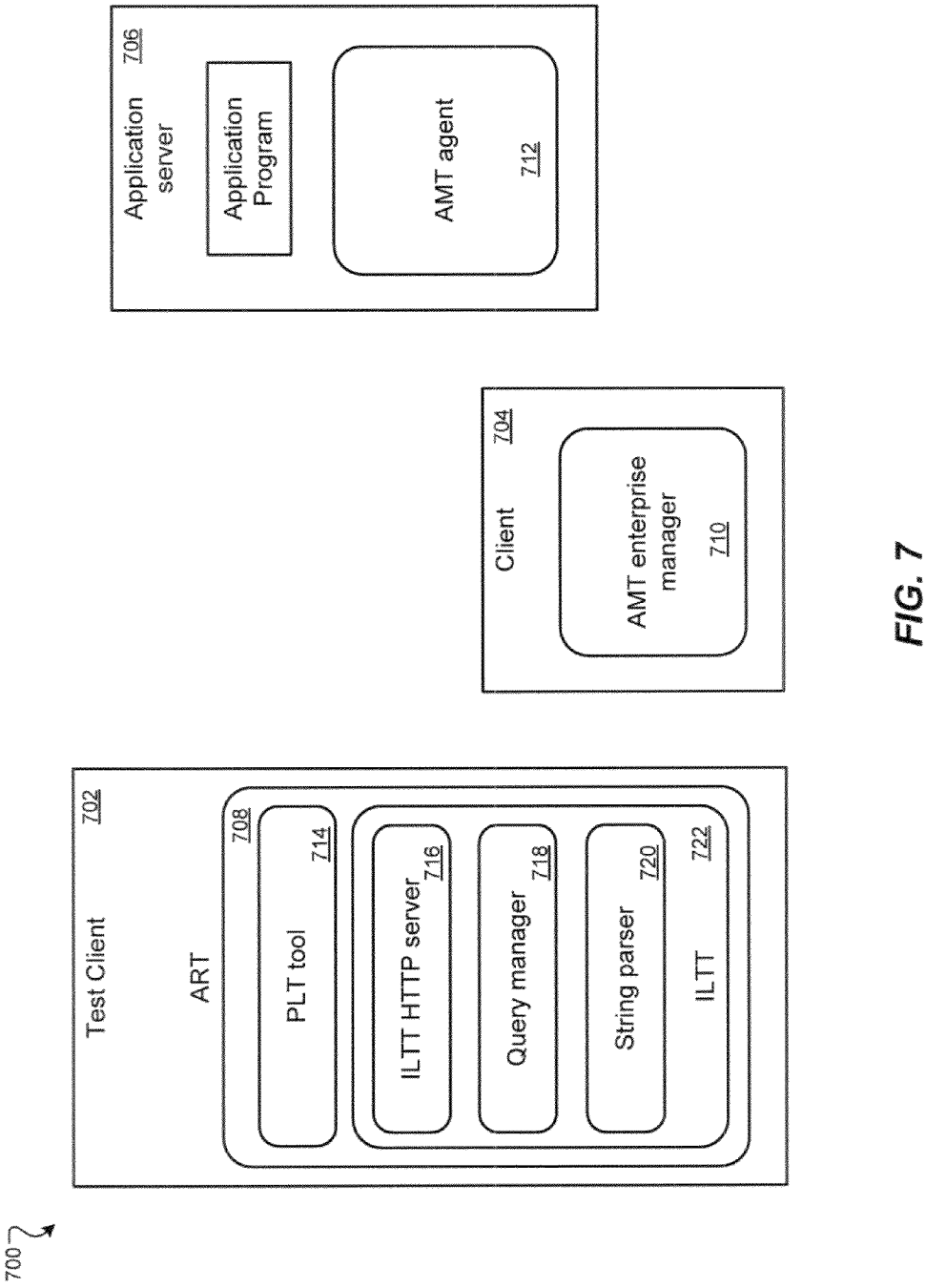
FIG. 7 is an exemplar testing architecture including an integrated load testing tool in accordance with implementations of the present disclosure.

FIG. 7 is an exemplar testing architecture 700 including an integrated load testing tool in accordance with implementations of the present disclosure. The architecture 700 can include a test client 702, a client 704, and an application server 706. The test client 702 can execute tests (e.g. load tests). The test client 702 includes ART 708. The client 704 includes AMT enterprise manager 710. The test client 702 can also be used as the client 704, if the client 704 does not generate significant performance overhead within the test client 702. The application server 706 is the server under test. An AMT agent 712 can be included in the test environment.

The ART can include PLT tool 714 and an integrated load-testing tool (ILTT) 722. The ILTT 722 can include an ILTT HTTP server 716, a query manager 718 and a string parser 720. In some implementations, the ILTT 722 can be a stand alone tool and may not be integrated into ART 708.

The integration of an AMT and a PLT tool can include the use of many software applications. In some implementations, referring to FIG. 7, the integration can begin in the user interface of the ART 708. The tester can select the use of the AMT and the PLT tool from the ART user interface. Prior to running a test, the ART 708 can copy the phase definitions (the consolidated values) determined by the tester from the test client 702 to the application server 706. The definition of the phases for a level-one breakdown can be manually added to an AMT agent profile included in the AMT agent 712. The definition for the probe directives file can also be included in the AMT agent profile. The AMT agent profile can be copied from the AMT agent 712 to the application server 106 using the ART 708.

The PLT tool 714 can instrument one or more virtual users depending on the selection made by the tester. In general, AMT instrumentation can create overhead in the application server 706, increasing server response times. The slower response times can distort the results of the testing measurements. The instrumentation of all the virtual users can increase overhead in the testing system as compared to the instrumentation of a single virtual user. Therefore, a tester may be more likely to select a single virtual user to minimize testing overhead.

The application server 706 can begin executing application programs (e.g., J2EE application execution) to generate the response for a PLT tool HTTP request. The PLT tool HTTP request includes an identifying request header (e.g., X CorrelationID) that can be added for each vuser. When the AMT agent 712 receives a test client request that includes the identifying request header, the AMT agent 712 can start the tracing.

In parallel with the application program execution in the application server 706, and if an AMT instrumented method is called during the application execution, the AMT agent 712 can begin to measure the elapsed time of called methods inside the application program. The AMT agent 712 can measure a routine (e.g., Java method) elapsed time according to probe directives included in the bytecode and the AMT agent 712 can include the elapsed time in the trace data. When method execution is complete, the AMT agent 712 can receive additional meta data from the application server 706. Examples of meta data for an instrumented method can include start time, end time, total duration, and relative timestamp. The AMT agent 712 can include the additional meta data in the trace data.

The AMT agent 712 can generate a trace data file to send to the AMT enterprise manager 710. The AMT enterprise manager 710 can save the trace data file as a formatted string (e.g., an XML string) in its internal database. In some implementations, the AMT enterprise manager 710 can also process the trace data file. The application server 706, the AMT agent 712 and the AMT enterprise manager 704 can operate in parallel. When the application program execution ends, the application server 706 can generate an HTTP response and send it back to the PLT tool 714 on the test client 702 that made the initial request.

The PLT tool 714 can retrieve the trace data file from the AMT enterprise manager's internal database using an intermediate HTTP server, ILTT HTTP server 716. The PLT tool 714 sends a request to the ILTT HTTP server 716 after virtual user transactions are complete. The ILTT HTTP server 716 can run throughout the entire testing period so it can receive HTTP requests from the PLT tool 714 at any time. When the ILTT HTTP server 716 receives an HTTP request from the PLT tool 714, it calls the query manager 718 to receive a response.

The query manager 718 can retrieve query parameters from the ART 708. The query manager 718 can send a request based on the query parameters to the AMT enterprise manager 710 to retrieve a stored formatted string from the AMT enterprise manager's internal database. The query manager 718 can handle the database communication between the ILTT HTTP server 716 and the AMT enterprise manager 710.

The query manager 718 can send the received formatted string to the string parser 720 to obtain HTTP server compatible values. The string parser 720 can parse the received string and return a formatted output string. In some implementations, the string parser 720 can support a level-one breakdown definition. For example, the string parser 720 can calculate the method response time duration and can aggregate individual routine elapsed times into phases. The string parser 720 can send the method response time durations and the phase durations back to the query manager 718. The query manager 718 can send the received durations to the ILTT HTTP server 716. After receiving the data from the query manager 718, the ILTT HTTP server 716 can generate an HTTP response to send back to the PLT tool 714. The PLT tool 714 can generate a data point in an online graph using the returned values. For example, a tester can manually log into the computer running the test client 702 and monitor the graphs produced by the PLT tool 714 during the execution of a load test.

In general, the query manager can communicate with the AMT enterprise manager 710. The query manager 718 can query the AMT enterprise manager 710 to retrieve data from the internal AMT enterprise manager's database. The query manager 718 can send the retrieved data to the string parser 720. The-string parser 720 can send the parsed data back to the query manager 718. The query manager can send the parsed data back to the ILTT HTTP server 716.

The PLT Tool request/response process described can repeat as long as a virtual user in the PLT tool 714 executes transactions with the application server 706. The PLT tool 714 can store all the traced data values it receives until the testing ends. Once testing is complete, an analyzer included in the PLT tool 714 can retrieve the stored trace data for the entire test and generate graphs. The analyzer can also generate HTML files from the stored trace data based on PLT tool graph definitions.

The ART 708 can parse the currently retrieved PLT tool data for the recently completed test and can also parse data stored from previous tests and generate regression graphs. In some implementations, the ART 708 can integrate the regression graphs into HTML files and send the HTML files to a regression web server for storage and further analysis.

Figure 8:
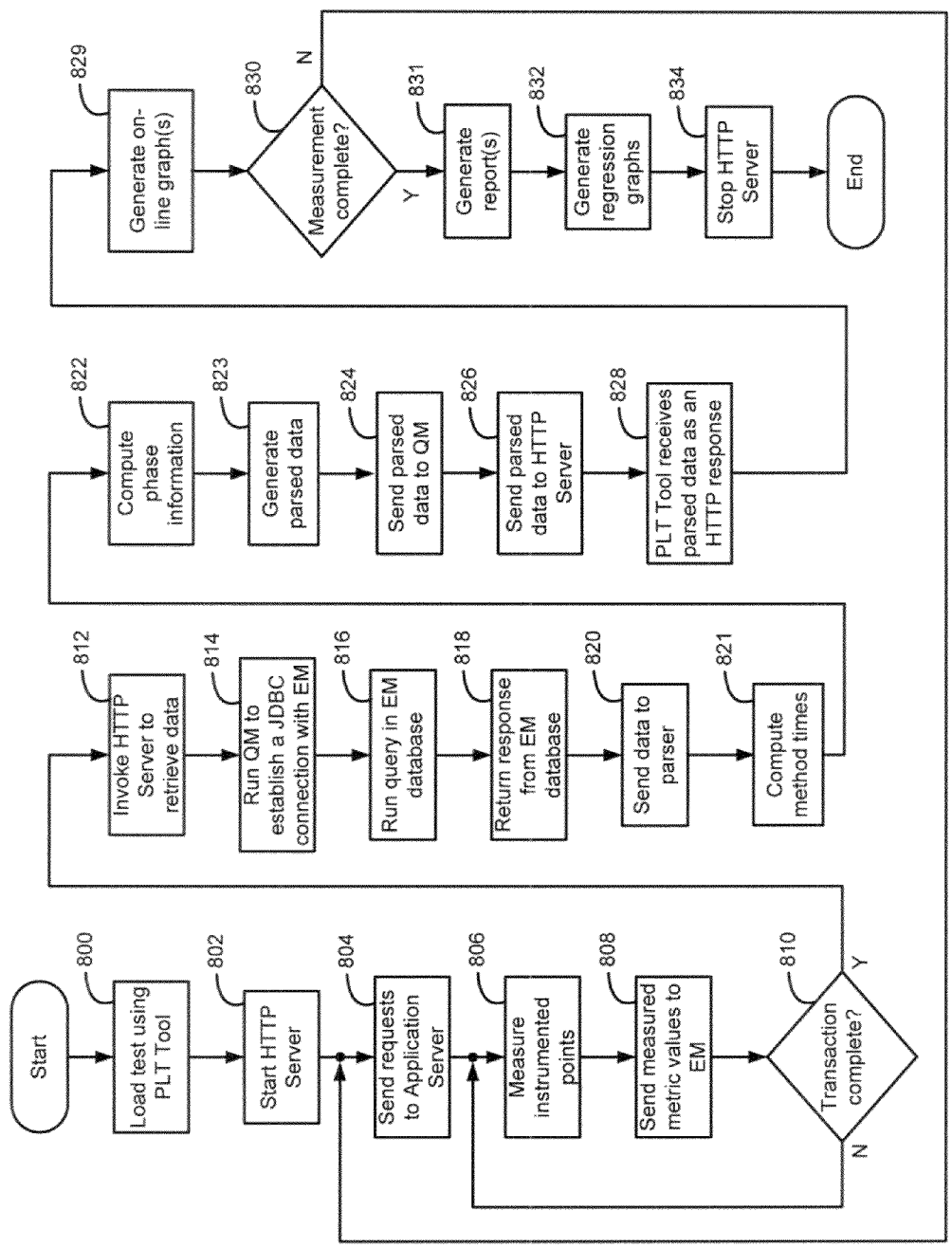
FIG. 8 is a flowchart illustrating exemplar steps that can be executed during load testing using the integrated load testing tool in accordance with implementations of the present disclosure.

FIG. 8 is a flowchart illustrating exemplar steps that can be executed during load testing using the integrated load testing tool in accordance with implementations of the present disclosure. For example, the exemplar steps of FIG. 8 may be implemented using software instructions stored in a computer-readable storage medium and executed by a processing system including one or more processing apparatus, or processors.

The description of the flowchart of FIG. 8 includes references to components included in FIG. 7. In step 800, a test is loaded using a PLT tool. For example, the ART 708 can start a load test using the PLT tool 714. In step 802, the HTTP server starts. For example, the ART 708 can start the ILTT HTTP server 716. In step 804, requests are sent to an application server. For example, the ART 708 can send HTTP requests to the application server 706. As described above, the HTTP requests can be embedded with an identifying request header (e.g., X-CorrelationID).

In step 806, instrumented points are measured. For example, the AMT agent 712 can measure instrumented points for the HTTP requests that include the identifying request header. In step 808, measured metric values are sent to the enterprise manager (EM). For example, the AMT agent 712 can send the measured metric values (what was measured during the execution of a application program) to the AMT enterprise manager 710. In step 810, it is determined whether the transaction is complete. If the transaction is not complete, execution loops back to step 806. If the transaction is complete, the HTTP server is invoked to retrieve data in step 812. For example, when the transaction is complete for the PLT tool vuser, the PLT tool 714 can invoke the ILTT HTTP server 716 to retrieve parsed data. In step 814, a query manager is run to establish a database conductivity (e.g. Java database conductivity (JDBC)) connection with the enterprise manager. For example, the ILTT HTTP server 716 can run the query manager 718 to establish a connection with the AMT enterprise manager 710.

In step 816, the query is run in the enterprise manager database. For example, the query manager 718 can run a database query in the AMT enterprise manager 710 using the JDBC connection. In step 818, the response is returned from the enterprise manager database. For example, the query manager 718 can receive a response (e.g., an XML string representing one application server dialog step) from the AMT enterprise manager's database. In step 820, the data is sent to the parser. For example, the query manager 718 can send the data to the string parser 720. In step 821, the elapsed times of the routines (e.g., Java methods) are computed. In step 822, phase information can be computed. In step 823, parsed data is generated. For example, the string parser 720 can receive the data from the query manager 718. The string parser 720 can compute the elapsed times for the routines for a level-one breakdown. The output can be a formatted string, for example. In some implementations, the string parser 720 can read the level-one breakdown from a property file. The string parser 720 can calculate the phases from the input string and format the phase values.

In step 824, the parsed data is sent to the query manager. For example, the string parser 720 can send the formatted data back to the query manager 718. In step 826, the parsed data is sent to the HTTP server. For example, the query manager 718 can send the parsed data back to the ILTT HTTP server 716. In step 828, the PLT tool can receive the parsed data as an HTTP response. For example, the ILTT HTTP server 716 can make the parsed data available to the PLT tool 714 through a web port and the PLT tool 714 can receive the data as an HTTP response. In step 829, one or more on-line graphs can be generated using the received parsed data. For example, the PLT tool 714 can generate user data points from the received data and can generate on-line graphs with the user data points for display to the user. In step 830, it is determined if all of the measurements for the load test have been completed. If there are additional measurements to perform for the load test, execution loops back to step 804. If the test is complete, one or more reports can be generated in step 831. For example, the PLT tool 714 can generate a report from the user data points received for all transactions in the load test. In step 832, regression graphs can be generated. For example, the ART 708 can use the data for regression graph generation and web server publishing. In step 834, the HTTP server is stopped. For example, the ART 708 stops the ILTT HTTP server 716.

Figure 9:
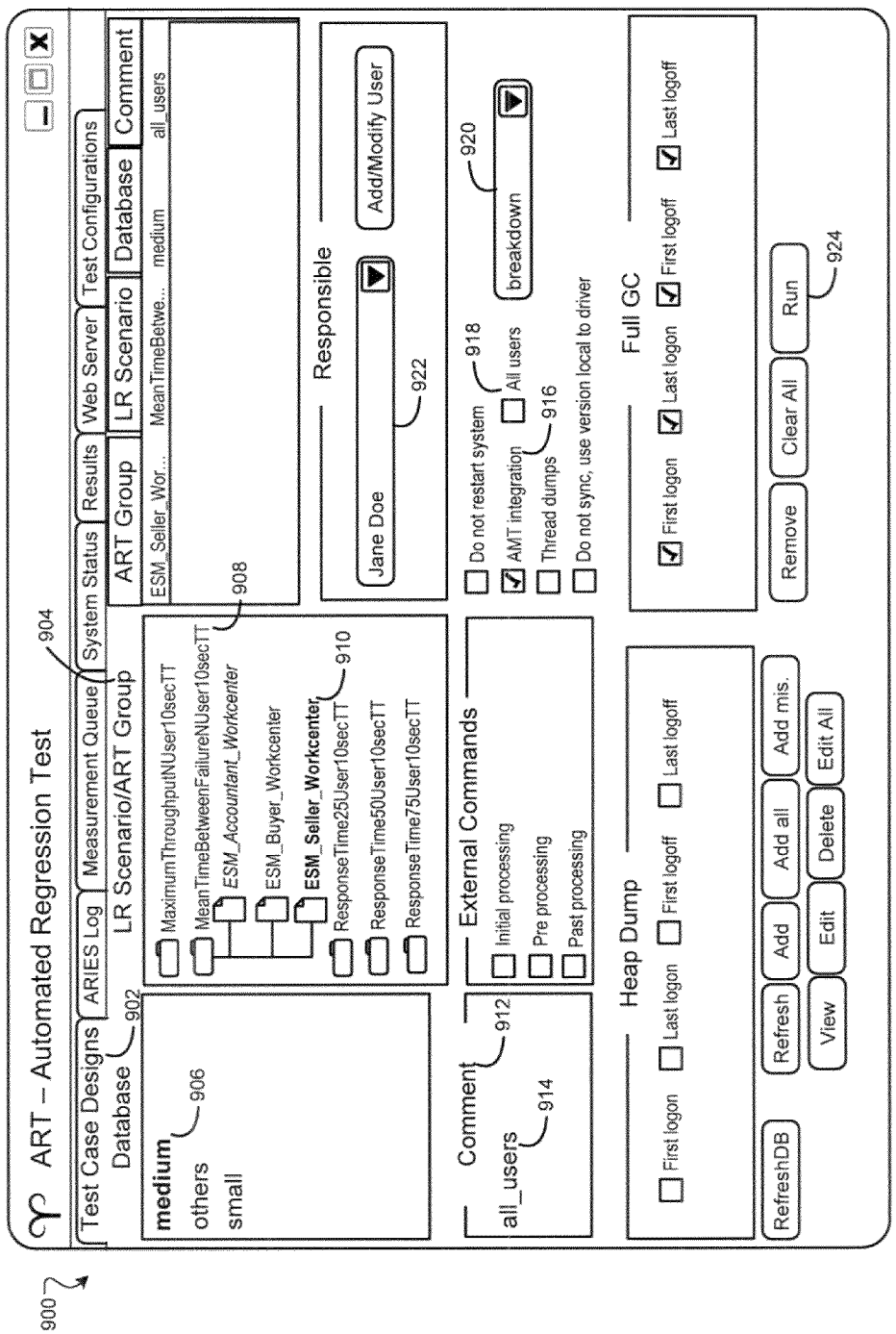
FIG. 9 is a screen-shot of exemplar performance testing using the integrated load testing tool in accordance with implementations of the present disclosure.

FIG. 9 provides a screen-shot 900 of exemplar performance testing using the integrated load testing tool in accordance with implementations of the present disclosure. The screen shot 900 shows a test start window of an application regression test (ART). A tester can select options from the test start window for a test prior to running the test.

The tester can select the type of the database in a database section 902. In the example shown in FIG. 9, the tester selected a "medium" database 906. The tester can select the type of test from a LR Scenario/ART Group section 904. In the example shown in FIG. 9, the tester selected a "MeanTimeBetweenFailureNUser.1secTT" test 908. The tester can select a PRT tool script after selecting the test type. In the example shown in FIG. 9, the tester selected an "ESM-_Seller_Workcenter" PRT tool script 910. The tester can enter a comment for the test in a comment field 912. In the example shown in FIG. 9, the tester entered a comment "all_users" 914. The tester can select the AMT integration button 916. The check box associated with the "AMT integration" selection is checked indicating the option is selected. In some implementations, the selection of AMT integration can force a restart of an application server.

The tester can select the all users button 918 to instrument all users. If the tester does not select the all users button 918 only the first user is instrumented. This option determines the number of virtual users for the test. In the example shown in FIG. 9, the tester has selected not to instrument all users, as the check box associated with the "All users" selection is not checked. Therefore, the test can use a single virtual user. The tester can select the name of a profile from the pull down list 920. In the example shown in FIG. 9, the user selected the "breakdown" profile.

Once the tester selects the options and criteria for the test, they can select a responsible individual for the test from the pull down list 922. In the example shown in FIG. 9, "Jane Doe" is selected as the responsible tester. Once all selections are made, the tester can select the Run button 924 to start the test.

Figure 10:
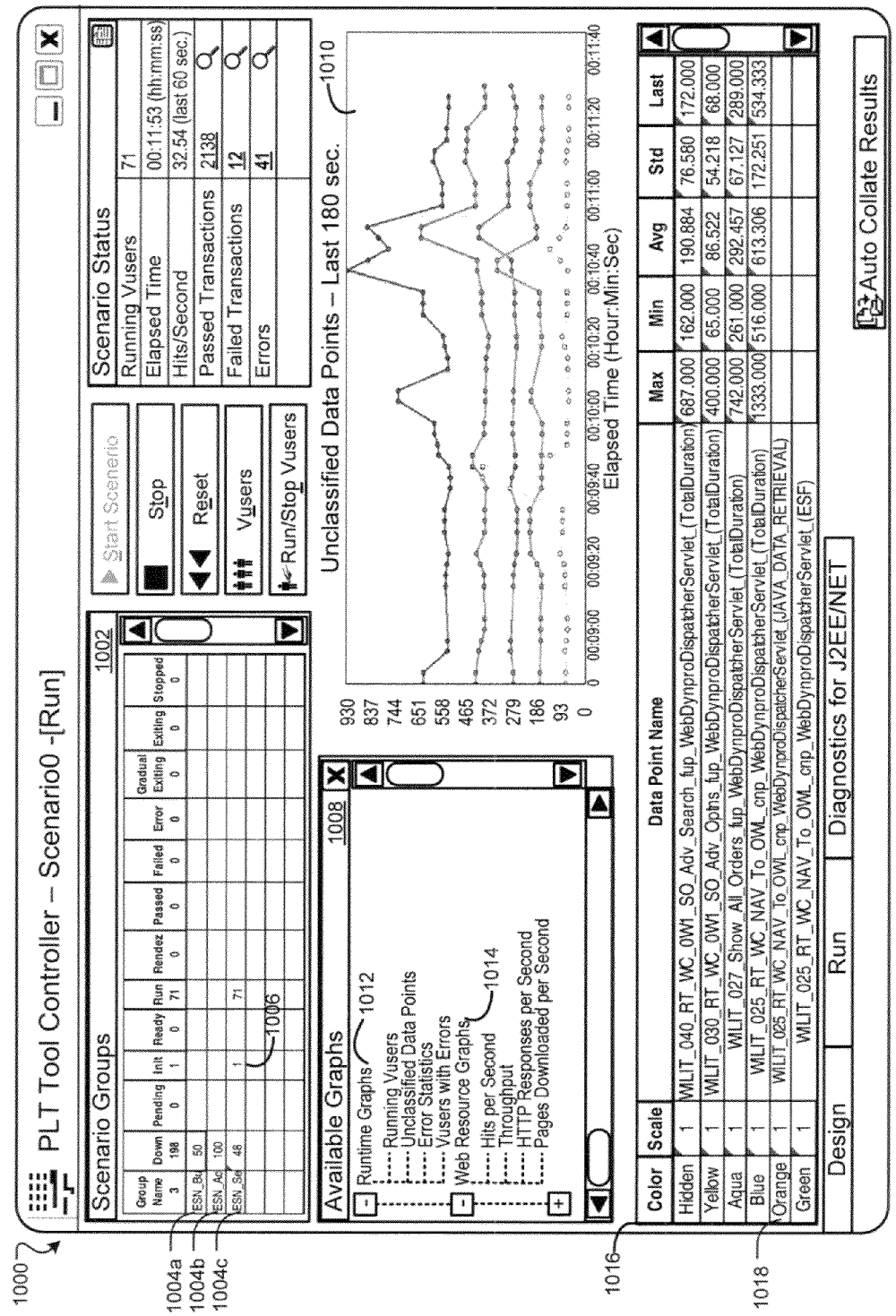
FIG. 10 is a screen-shot of exemplar real-time monitoring during load testing using the integrated load testing tool in accordance with implementations of the present disclosure.

FIG. 10 is a screen-shot 1000 of exemplar real-time monitoring during load testing using the integrated load testing tool in accordance with implementations of the present disclosure. The screen shot 1000 shows an online monitoring of a load test by an application management unit (AMT) in a PRT tool user interface. The tester can monitor routine (e.g., Java method) elapsed times broken down into phases. The tester can monitor the status of the virtual users in the scenario groups view 1002. The scenario groups view 1002 can show the number of virtual users and the states they are currently in. In the example shown in FIG. 10, there are three virtual users 1004a, 1004b, 1004c. Virtual user 1004c is in the initialization state 1006.

In the available graphs view 1008, the tester can select a group of graphs for display in a graph view 1010. In the example shown in FIG. 10, the user selected runtime graphs 1012 and web resource groups 1014. The tester can select the data used for the individual graph displayed in the graph view 1010 in a graph selection view 1016. In the example shown in FIG. 10, the tester selected graph selection view 1018, which is displayed in the graph view 1010.

In some implementations, a tester may execute a mass performance test on a system that can simulate a plurality of system users while analyzing the performance of one of the users. For example, a tool or test routine external to the system in test can simulate the plurality of system users. A tool or test routine internal to the system in test (e.g., the integrated load testing tool described with reference to FIGS. 7, 8, 9, and 10) can perform in-depth runtime analysis of the performance of one of the plurality of system users (e.g., a single user). The tester may assume that performance issues identified from the analysis of the test results for the single user (e.g., system bottlenecks) may also be performance issues for each of the plurality of system users.

Figure 11:
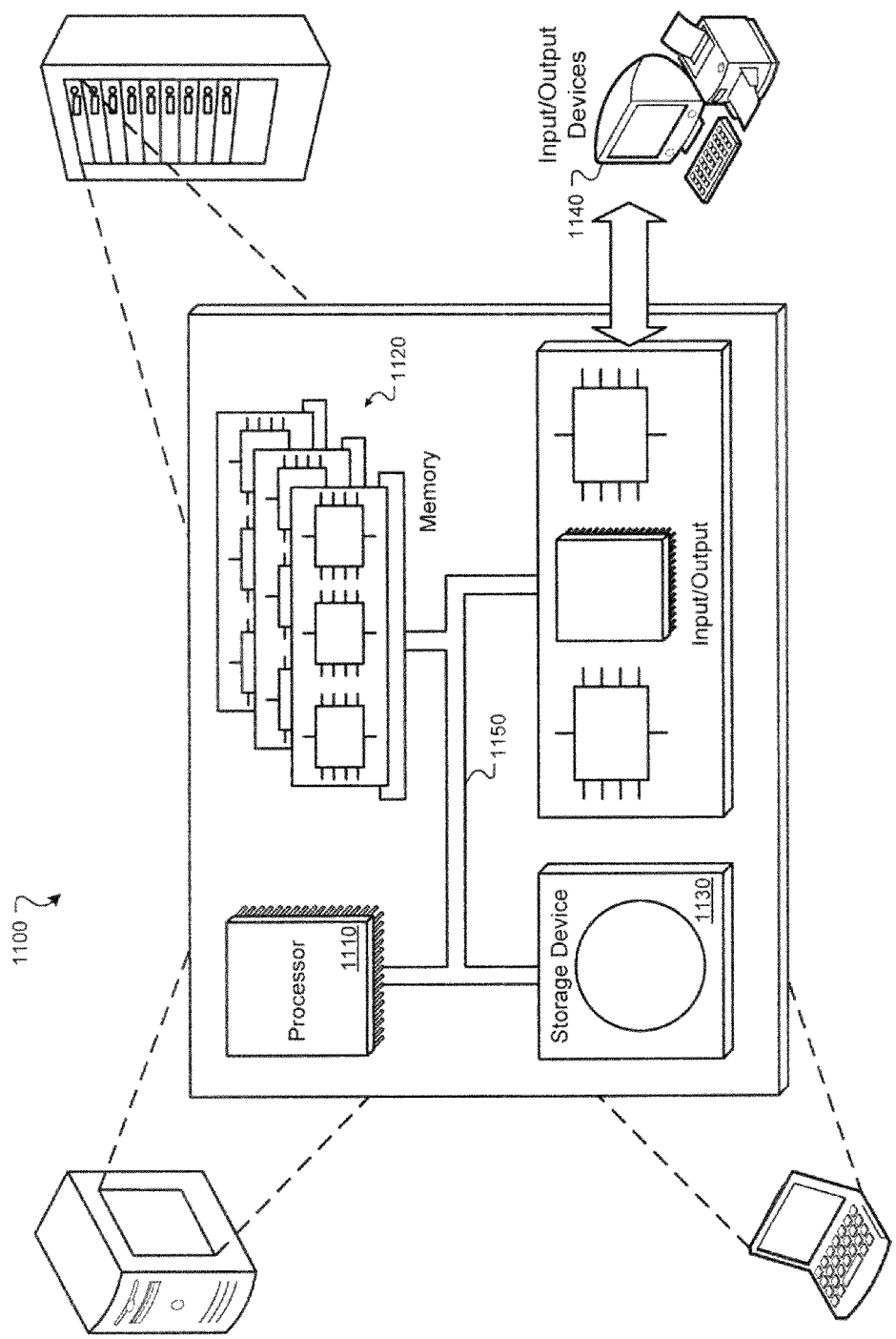
FIG. 11 is a schematic illustration of exemplar computer systems that can be used to execute implementations of the present disclosure.

Referring now to FIG. 11, a schematic diagram of an exemplar computer system 1100 is provided. The system 1100 can be used for the operations described in association with the methods described in FIGS. 3-10 according to one implementation. For example, the system 1100 may be included in any or all of the servers 110. The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit. The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device. The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A method of testing an application, comprising:
loading a testing tool by a client that is in communication with an application server that executes the application;
processing, by a first component of the testing tool executed by the client, one or more probe builder directives to provide and inject probe code into a routine, the routine being called during execution of the application;
transmitting a request to the application using a second component of the testing tool;
determining an elapsed time of an execution of the routine based on the probe code;
generating a response from the application server based on the request; determining a response time based on the request and the response;
calculating performance statistics based on the elapsed time and the response time;
determining a performance of the application based on the elapsed time and the response time; and
comparing the performance to a baseline performance, the baseline performance corresponding to a previous version of the application, and if the performance is determined to be deficient based on the comparing, generating an indication that the performance is deficient.

2. The method of claim 1, further comprising:
installing an agent on the application server;
receiving, at the agent, at least one of a start time of the routine, an end time of the routine, a total duration of the routine, a relative timestamp, and metadata;
generating trace data based on the at least one of the start time, the end time, the total duration, the relative timestamp, and the metadata; and
storing the trace data in a database that is remote from the application server.

3. The method of claim 1, further comprising:
issuing a command from the second component;
retrieving trace data corresponding to the elapsed time based on the command; and
providing the trace data to the second component.

4. The method of claim 3, wherein retrieving trace data comprises:
generating a query based on query parameters provided by a test infrastructure within which the testing tool is executed;
accessing a database in which the trace data is stored based on the query;
receiving a data string from the database based on the query;
parsing the data string to determine the elapsed time; and
providing the elapsed time to the second component.

5. The method of claim 1, wherein the elapsed time includes one or more phase durations each of which corresponds to a phase of the routine.

6. The method of claim 1, further comprising simulating a virtual user at the client using the second component of the testing tool, the virtual user transmitting the request to the application server.

7. The method of claim 1, further comprising:
providing the elapsed time and the response time to the second component of the testing tool; and
generating one or more graphs based on the elapsed time and the response time using the second component, the graphs corresponding to the performance of the application.

8. A computer-readable storage medium coupled to one or more processors and having instructions stored thereon which, when executed by the one or more processors, cause the one or more processors to perform operations comprising:
loading a testing tool by a client that is in communication with an application server that executes the application;
processing, by a first component of the testing tool executed by the client, one or more probe builder directives to provide and inject probe code into a routine, the routine being called during execution of the application;
transmitting a request to the application using a second component of the testing tool;
determining an elapsed time of an execution of the routine based on the probe code;
generating a response from the application server based on the request;
determining a response time based on the request and the response;
calculating performance statistics based on the elapsed time and the response time;
determining a performance of the application based on the elapsed time and the response time; and
comparing the performance to a baseline performance, the baseline performance corresponding to a previous version of the application, and if the performance is determined to be deficient based on the comparing, generating an indication that the performance is deficient.

9. The storage medium of claim 8, wherein the operations further comprise:
installing an agent on the application server;
receiving, at the agent, at least one of a start time of the routine, an end time of the routine, a total duration of the routine, a relative timestamp, and metadata;
generating trace data based on the at least one of the start time, the end time, the total duration, the relative timestamp, and the metadata; and
storing the trace data in a database that is remote from the application server.

10. The storage medium of claim 8, wherein the operations further comprise:
issuing a command from the second component;
retrieving trace data corresponding to the elapsed time based on the command; and
providing the trace data to the second component.

11. The storage medium of claim 10, wherein retrieving trace data comprises:
generating a query based on query parameters provided by a test infrastructure within which the testing tool is executed;
accessing a database in which the trace data is stored based on the query;
receiving a data string from the database based on the query;
parsing the data string to determine the elapsed time; and
providing the elapsed time to the second component.

12. The storage medium of claim 8, wherein the elapsed time includes one or more phase durations each of which corresponds to a phase of the routine.

13. The storage medium of claim 8, wherein the operations further comprise simulating a virtual user at the client using the second component of the testing tool, the virtual user transmitting the request to the application server.

14. The storage medium of claim 8, wherein the operations further comprise:
providing the elapsed time and the response time to the second component of the testing tool; and generating one or more graphs based on the elapsed time and the response time using the second component, the graphs corresponding to the performance of the application.

15. A system for of testing an application, comprising:
one or more processors; and
a computer-readable storage medium coupled to the one or more processors having instructions stored thereon which, when executed by the one or more processors, cause the one or more processors to perform operations comprising:
loading a testing tool by a client that is in communication with an application server that executes the application;
processing, by a first component of the testing tool executed by the client, one or more probe builder directives to provide and inject probe code into a routine, the routine being called during execution of the application;
transmitting a request to the application using a second component of the testing tool;
determining an elapsed time of an execution of the routine based on the probe code;
generating a response from the application server based on the request;
determining a response time based on the request and the response;
calculating performance statistics based on the elapsed time and the response time;
determining a performance of the application based on the elapsed time and the response time; and
comparing the performance to a baseline performance, the baseline performance corresponding to a previous version of the application, and if the performance is determined to be deficient based on the comparing, generating an indication that the performance is deficient.

16. The system of claim 15, wherein the operations further comprise:
installing an agent on the application server;
receiving, at the agent, at least one of a start time of the routine, an end time of the routine, a total duration of the routine, a relative timestamp, and metadata;
generating trace data based on the at least one of the start time, the end time, the total duration, the relative timestamp, and the metadata; and
storing the trace data in a database that is remote from the application server.

17. The system of claim 15, wherein the operations further comprise:
issuing a command from the second component;
retrieving trace data corresponding to the elapsed time based on the command; and
providing the trace data to the second component.

18. The system of claim 15, wherein the operations further comprise:
providing the elapsed time and the response time to the second component of the testing tool; and
generating one or more graphs based on the elapsed time and the response time using the second component, the graphs corresponding to the performance of the application.

* * * * *